United States Patent
Yoshida et al.

(10) Patent No.: US 8,005,424 B2
(45) Date of Patent: Aug. 23, 2011

(54) COMMUNICATION DEVICE AND COMMUNICATION METHOD OF UNDERWATER VEHICLE

(75) Inventors: Hiroshi Yoshida, Miura-gun (JP); Taro Aoki, Zushi (JP); Katsuki Fujimoto, Osaka (JP); Osamu Numamoto, Osaka (JP)

(73) Assignee: Japan Agency for Marine-Earth Science and Technology, Yokosuka-shi (JP)

( * ) Notice: Subject to any disclaimer, the term of this patent is extended or adjusted under 35 U.S.C. 154(b) by 1037 days.

(21) Appl. No.: 11/545,552

(22) Filed: Oct. 11, 2006

(65) Prior Publication Data

US 2008/0090518 A1  Apr. 17, 2008

(51) Int. Cl.
*H04B 13/02* (2006.01)

(52) U.S. Cl. ............... 455/40; 455/96; 455/98; 455/72; 367/131; 367/134; 367/142; 367/904; 340/850; 343/709; 343/719

(58) Field of Classification Search .............. 455/40, 455/72, 98, 96; 367/131, 134; 340/850; 343/709; 114/21.2, 245, 328
See application file for complete search history.

(56) References Cited

U.S. PATENT DOCUMENTS

| | | | | |
|---|---|---|---|---|
| 5,291,194 A | * | 3/1994 | Ames | 340/850 |
| 5,579,285 A | * | 11/1996 | Hubert | 367/133 |
| 5,748,102 A | * | 5/1998 | Barron | 340/850 |
| 5,894,450 A | * | 4/1999 | Schmidt et al. | 367/134 |
| 6,058,874 A | * | 5/2000 | Glenning et al. | 114/328 |
| 6,130,859 A | * | 10/2000 | Sonnenschein et al. | 367/134 |
| 6,167,831 B1 | * | 1/2001 | Watt et al. | 114/322 |
| 6,213,021 B1 | * | 4/2001 | Pickett | 102/402 |
| 6,307,810 B1 | * | 10/2001 | Shany et al. | 367/131 |
| 6,385,131 B1 | * | 5/2002 | Woodsum et al. | 367/142 |
| 6,483,865 B1 | * | 11/2002 | Beierle | 375/130 |
| 6,580,541 B1 | * | 6/2003 | Yamashita et al. | 398/104 |
| 6,999,857 B1 | * | 2/2006 | Kasper et al. | 701/1 |
| 7,013,827 B2 | * | 3/2006 | Harland-White | 114/321 |
| 7,102,532 B2 | * | 9/2006 | Hudson | 340/854.6 |
| 7,711,322 B2 | * | 5/2010 | Rhodes et al. | 455/40 |

FOREIGN PATENT DOCUMENTS

JP  H4-55498  12/1992

(Continued)

OTHER PUBLICATIONS

Hiroshi Yoshida, et al., "A Small-type ROV/AUV for Shallow water zone and its Communication-Observation device", Collected Papers for Lecture, Advanced Marine Science and Technology Society, Oct. 13th & 14th, 2005, pp. 55-58, including Partial Translation.

(Continued)

*Primary Examiner* — Marceau Milord
(74) *Attorney, Agent, or Firm* — Crowell & Moring LLP

(57) ABSTRACT

The present invention provides a communication device and a communication method of an underwater vehicle, which use an electromagnetic field (electromagnetic wave), having a higher propagation speed than that of an acoustic wave, for communication between an underwater vehicle and a mother vessel or the like so as to allow real-time control of the underwater vehicle and the like and further to make the communication little sensitive to noise and the like. The communication device performs wireless communication between an underwater vehicle in water and an object on land or on water, and is configured to compress data to be transmitted and transmit/receive the compressed data by the use of a low-frequency electromagnetic field.

2 Claims, 2 Drawing Sheets

FOREIGN PATENT DOCUMENTS

| | | |
|---|---|---|
| JP | 07-327069 | 12/1995 |
| JP | 2001-48088 A | 2/2001 |
| JP | 2004-096182 | 3/2004 |
| JP | 2004-531939 A | 10/2004 |
| JP | 2005-020422 | 1/2005 |
| WO | WO 02/082696 A2 | 10/2002 |

OTHER PUBLICATIONS

Office Action in Japanese Patent Application No. 2005-030357 dated Aug. 17, 2010.

Notification of Reasons for Refusal in Japanese Patent Application No. 2005-030357 dated Apr. 5, 2011.

\* cited by examiner

COMMUNICATION DEVICE AND COMMUNICATION METHOD OF UNDERWATER VEHICLE

BACKGROUND OF THE INVENTION

The present invention relates to a communication device and a communication method of an underwater vehicle.

Unmanned underwater vehicles used for underwater investigation, search, and the like are broadly classified into a cable type underwater vehicle connected with a mother vessel which conveys and operates the underwater vehicle through a cable for electric power transmission or communication, and a non-cable type underwater vehicle not connected with the mother vessel. Each of the underwater vehicles is used in a scene according to its characteristic.

Out of those underwater vehicle, the non-cable type underwater vehicle is capable of moving freely since being not restricted due to a cable, and is particularly advantageous in search in deep sea and the like. Further, the non-cable type underwater vehicle is advantageous in being conveyable and operable by a small-sized mother vessel since it is not necessary to take up a cable.

However, on account of being not connected through a cable, the non-cable type underwater vehicle is naturally disadvantageous in respect of information transmission (communication) and the like, and in order to eliminate this disadvantage, a variety of techniques have been conventionally adopted.

JP-A-2001-48088 discloses a technique regarding communication between an underwater vehicle and a mother vessel. Specifically, bidirectional communication by underwater acoustic communication is performed between an underwater vehicle and a mother vessel by the use of an acoustic transducer provided in the mother vessel and an acoustic transducer provided in the underwater vehicle. Underwater information acquired by the underwater vehicle is transmitted to the mother vessel on the sea according to an acoustic wave from the mother vessel on the sea through an acoustic transducer. Further, a mission of the underwater vehicle can be changed according to contents of command of the acoustic wave from the mother vessel on the sea.

A low-frequency acoustic wave is suitable for communication of the underwater vehicle as having small attenuation in water. However, the acoustic wave has the drawback of being unusable for real-time remote control since the propagation speed of the acoustic wave is low.

In the cable type underwater vehicle, for example, it is possible to instantaneously transmit an image (projected image) having been taken in water from the underwater vehicle to the mother vessel through a cable, and on the mother vessel, it is possible to control a manipulator or the like, provided in the underwater vehicle, in real time while looking at the image so as to perform an operation.

However, in a case where a non-cable type underwater vehicle performs communication by means of an acoustic wave, an image actually taken by the underwater vehicle and an image that can be seen on the mother vessel are temporally deviated different images due to occurrence of communication delay time. Hence it is practically impossible to control the manipulator or the like while looking at the image to perform an operation.

Further, the communication by means of an acoustic wave has the drawback of being susceptible to mechanical noise made by the underwater vehicle itself. Moreover, the communication by means of an acoustic wave has the drawback of being unfavorably performed due to multi-path fading in the case of communication in a shallow sea or within a restricted space.

SUMMARY OF THE INVENTION

It is an object of the present invention to provide a communication device and a communication method of an underwater vehicle which use an electromagnetic field (electromagnetic wave) for wireless communication between an underwater vehicle and a mother vessel or the like to allow transmission of high-speed data, and further stable communication insensitive to noise.

A communication device according to the present invention is a communication device for performing wireless communication between underwater vehicles in water, or between an underwater vehicle in water and an object on land or on water, wherein the device is configured to compress data to be transmitted and transmit/receive the compressed data by the use of a low-frequency electromagnetic field.

Further, a communication method of the present invention is a communication method for performing wireless communication between underwater vehicles in water, or between an underwater vehicle in water and an object on land or on water, the method having the steps of: compressing data to be transmitted; and transmitting/receiving the compressed data by the use of a low-frequency electromagnetic field.

According to what was described above, since wireless communication between underwater vehicles in water, or between an underwater vehicle in water and an object on land or on water, is performed using an electromagnetic field, it is possible to transmit high-speed data compared with the case of using an acoustic wave. This enables real-time control of the underwater vehicle. Further, the use of the electromagnetic field makes the device less sensitive to noise of the underwater vehicle and fading. It is therefore possible to enhance stability of communication.

The electromagnetic field used for communication has the following property. When a frequency is high (e.g. 100 kHz or more), a larger amount of information can be transmitted, but since the electromagnetic field is rapidly attenuated in water, communication in a distance of only the order of several meters can be performed. On the contrary, when the frequency is low, underwater attenuation of the electromagnetic field is small and remote-control communication can be performed, but an amount of transmittable information is small. On this account, in the present invention, a low-frequency electromagnetic field is used to ensure communication distance, and further, data to be transmitted is compressed to allow transmission of a larger amount of data despite the low frequency. In this manner, it is possible to make the electromagnetic field sufficiently sustainable for actual use even in transmission of a large amount of data such as a projected image.

It is preferable that the communication device comprise: a code controller which compresses and expands data; a digital modem which modulates and demodulates the compressed data; and a transceiver which transmits/receives the modulated data by the low-frequency electromagnetic field. This makes it possible to suitably realize the above-mentioned communication device and communication method.

It is preferable that the transmission/reception by the electromagnetic field be performed at a frequency of 100 kHz or less. This makes it possible to reduce attenuation of the electromagnetic field in water to suitably perform remote-control communication.

DETAILED DESCRIPTION OF THE PREFERRED EMBODIMENT

Figure 1:
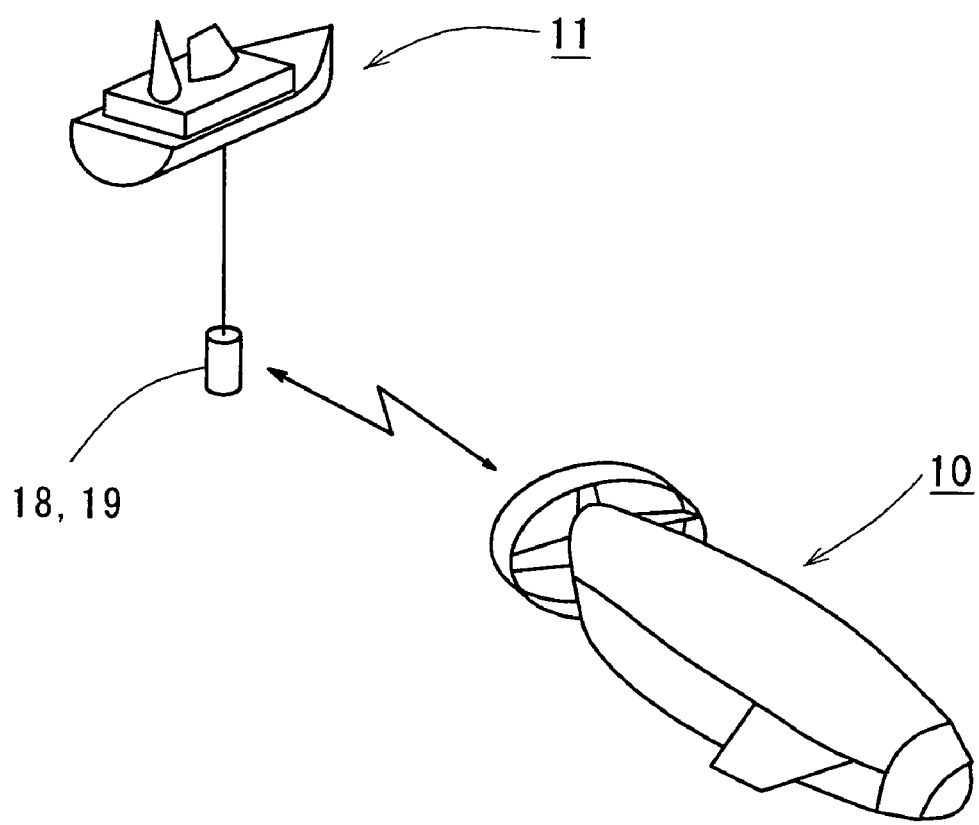
FIG. 1 is an oblique view showing an underwater vehicle and a mother vessel according to an embodiment of the present invention.

In the following, an embodiment of the present invention is described with reference to drawings. FIG. 1 is an oblique view showing an underwater vehicle 10 and a mother vessel 11. The underwater vehicle 10 is a non-cable type underwater vehicle and is thus not connected with the mother vessel 11 through a cable but performs communication through the use of a radio.

Figure 2:
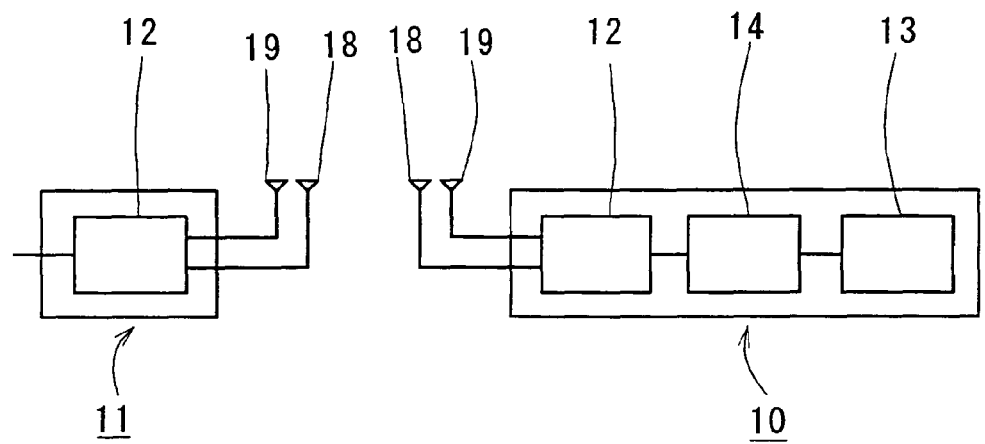
FIG. 2 is a schematic view showing the underwater vehicle and the mother vessel.

FIG. 2 is a schematic view showing the underwater vehicle 10 and the mother vessel 11. The underwater vehicle 10 and the mother vessel 11 are each provided with a communication device 12 for performing mutual communication. Further, the underwater vehicle 10 is provided with a variety of peripheral devices 13 including a propeller such as a thruster, observation devices such as an underwater camera and sonar, and an operational device such as a manipulator. Moreover, these peripheral devices 13 are controlled by a control device 14. The control device 14 is arranged to control the peripheral devices 13 according to a control signal transmitted from a mother vessel 11 through a communication device 12.

Namely, the underwater vehicle 10 of the present embodiment is configured to be remote-controllable from the mother vessel 11 through the communication devices 12.

Figure 3:
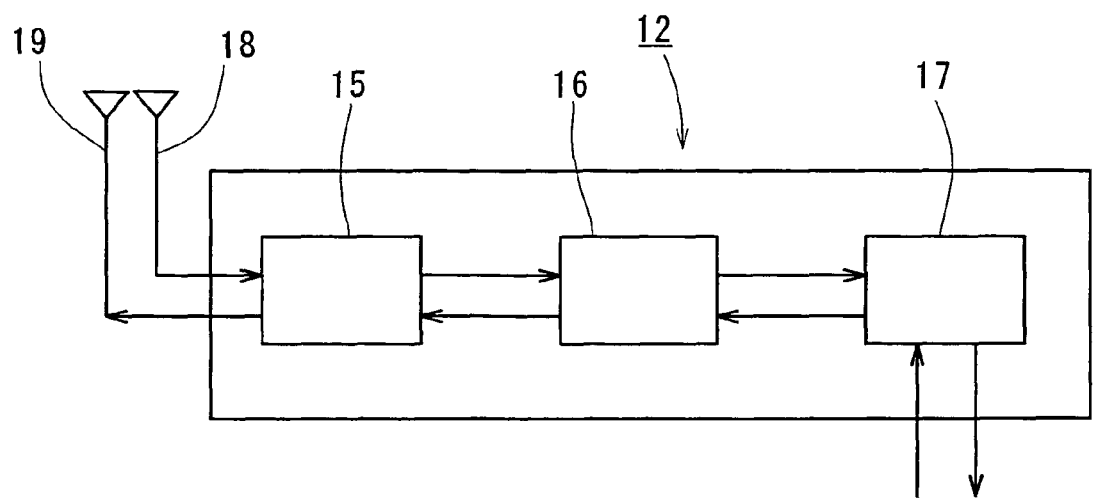
FIG. 3 is a schematic view showing a communication device.

FIG. 3 is a schematic view showing the communication device 12. This communication device 12 is provided with a transceiver 15, a digital modem 16, and a code controller 17.

The communication device 12 of the present invention is not like a communication device conventionally installed in the underwater vehicle 10 which uses an acoustic wave, but a communication device which uses an electromagnetic field (electromagnetic wave) to transmit/receive data. The transceiver 15 is comprised of a receiving antenna 18 and a transmission antenna 19, or a common antenna having functions of both, an amplifier that generates power required for transmission, a preamplifier that amplifies a reception signal, a filter, a mixer, a transmitter, and the like. Further, a frequency band of the electromagnetic field used in this transceiver 15 is, so called, a low frequency (LF) band (300 to 30 kHz), a very low frequency (VLF) band (30 to 3 kHz), or an extremely low frequency (ELF) band (3 kHz to 3 Hz), and is more specifically a band of 100 kHz to hundreds of Hz.

The code controller 17 is equipped with the function of compressing data intended to be transmitted and expanding the compressed data. Further, the code controller 17 may also be provided with the function of coding and decoding data according to need.

The digital modem 16 is equipped with the function of modulating the data compressed in the code controller 17 into a form transmittable/receivable by the transceiver 15, and demodulating the modulated signal. In the present embodiment, the digital modem 16 is equipped with the function of multi-level modulating/demodulating compressed data and detecting and correcting an error according to need.

A case is described where, in the above-mentioned communication device 12, for example, data acquired by the underwater vehicle 10 (e.g. an image taken by a camera) is transmitted to the mother vessel 11. First, data of the image taken by the camera is transmitted to the communication device 12 by control by the control device 14, to be inputted into the code controller 17 of the communication device 12.

In the code controller 17, the data is digital-compressed into a prescribed code form, to reduce a data capacity. In other words, the amount of data transmittable per unit time is increased.

Next, multi-level modulation of the digital compressed data is performed by the digital modem 16. As a method for this modulation, a conventional known method, such as amplitude modulation, frequency modulation or phase modulation, can be employed. Performing multi-level modulation of data makes it possible to increase an amount of information per code.

The signal converted into a transmittable signal by the digital modem 16 is transmitted by the use of an electromagnetic field transmitted from an antenna of the transceiver 15, and is received by an antenna of the transceiver 15 of the mother vessel 11.

Under the present circumstances, the frequency of the electromagnetic field is a low frequency of 100 kHz or less, and attenuation in water is thus small, thereby permitting communication from the underwater vehicle 10 to the far-off mother vessel 11. Further, since the transmitted data is compressed, it is possible to transmit a large amount of data despite the low-frequency electromagnetic field. The electromagnetic field is transmitted at high speed even compared with an acoustic wave, and the transmitted data signal is received instantaneously.

The data signal received by the transceiver 15 of the mother vessel 11 is subjected to processing such as amplification, and subsequently inputted into the digital modem 16 to be demodulated. The demodulated data is further inputted into the code controller 17 for canceling the compression (for expansion), and the data is decoded if having been coded, thereby to reproduce the original data. The reproduced data can be replayed in real time by playback equipment of a monitoring device or the like.

As described above, while transmission of the data collected by the underwater vehicle 10 was described, transmission of data from the mother vessel side can be performed in the same manner. For example, it is possible to transmit a control signal of a transmission command for transmitting data collected by the underwater vehicle 10 to the mother vessel 11, a control signal in the case of performing operation by means of the manipulator or the like according to an image replayed on the mother vessel 11, and some other signals.

As thus described, since collected data, a control signal and the like can be instantaneously transmitted/received between the underwater vehicle 10 and the mother vessel 11, it is possible to control the underwater vehicle in real time from the mother vessel so as to perform a variety of operations, maneuvering and the like. Further, since the electromagnetic field is used for communication, the communication is insensitive to noise of the underwater vehicle and can thus be performed in a stable manner.

The present invention is not restricted to the above-mentioned embodiment, and its design can be changed as appropriate. For example, the present invention can be adopted not only to a non-cable type underwater vehicle but to a cable type underwater vehicle. In this case, cable communication and wireless communication can be simultaneously used. Further, optical remote-control communication, acoustic remote-control communication and the like may be simultaneously used, and the communication mode may be switched to the optimum one according to the situation.

The present invention is also adoptable not only to an unmanned underwater vehicle but also to a manned underwater vehicle. Further, the underwater vehicle may be communicated not only with a mother vessel on sea (on water) but also with a base on land, another underwater vehicle in water, or the like.

What is claimed is:

1. A communication device of an underwater vehicle, for performing communication between an underwater vehicle in water and an object on land or on water, or between underwater vehicles in water, the device comprising:
   a code controller that compresses and expands data;
   a digital modem that modulates and demodulates the compressed data; and
   a transceiver that transmits/receives the modulated data by the low-frequency electromagnetic field,
   wherein the device is operable in a plurality of communication modes, including cable communication, wireless communication, optical remote-control communication, and acoustic remote-control communication,
   wherein the device is switchable from one of the communication modes to another of the communication modes as an optimum communication mode, based on a communication situation,
   wherein, in the wireless communication, the device is configured to compress data to be transmitted and transmit/receive the compressed data by the use of a low-frequency electromagnetic field, and
   wherein the transmission/reception by the electromagnetic field is performed at a frequency of 100 kHz or less.

2. A communication method of an underwater vehicle, for performing communication between an underwater vehicle in water and an object on land or on water, or between underwater vehicles in water, the method comprising the steps of:
   compressing data to be transmitted; and transmitting/receiving the compressed data by the use of a low-frequency electromagnetic field,
   wherein the transmission/reception by the electromagnetic field is performed at a frequency of 100 kHz or less,
   wherein the method is operable in a plurality of communication modes, including cable communication, wireless communication, optical remote-control communication, and acoustic remote-control communication, and
   wherein the transmitting/receiving step is switchable from one of the communication modes to another of the communication modes as an optimum communication mode, based on a communication situation.

* * * * *